US008805985B2

(12) United States Patent
Monjas Llorente et al.

(10) Patent No.: US 8,805,985 B2
(45) Date of Patent: Aug. 12, 2014

(54) METHOD FOR PRIVACY MANAGEMENT IN AN IDENTITY NETWORK, PHYSICAL ENTITIES AND COMPUTER PROGRAM THEREFOR

(75) Inventors: Miguel Angel Monjas Llorente, Madrid (ES); José María Del Álamo Ramiro, Alcorcon (ES); Beatríz San Miguel González, Madrid (ES); Juan Carlos Yelmo García, Móstoles (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 5 days.

(21) Appl. No.: 13/263,669

(22) PCT Filed: Apr. 8, 2009

(86) PCT No.: PCT/EP2009/054223
§ 371 (c)(1),
(2), (4) Date: Oct. 7, 2011

(87) PCT Pub. No.: WO2010/115460
PCT Pub. Date: Oct. 14, 2010

(65) Prior Publication Data
US 2012/0030336 A1 Feb. 2, 2012

(51) Int. Cl.
*G06F 15/173* (2006.01)
(52) U.S. Cl.
USPC ............ 709/223; 709/224; 709/225; 709/226
(58) Field of Classification Search
USPC ........................ 709/225, 226, 227, 228, 229
See application file for complete search history.

(56) References Cited

U.S. PATENT DOCUMENTS 6,957,199 B1 * 10/2005 Fisher ............................ 705/78
2003/0009593 A1 * 1/2003 Apte ............................ 709/245

(Continued)

FOREIGN PATENT DOCUMENTS

| CN | 101026650 A | 8/2007 |
|----|-------------|--------|
| CN | 101272281 A | 9/2008 |
| EP | 2031540 A1 | 3/2009 |

OTHER PUBLICATIONS

Kellomaki, S. et al. (Ed.). "Liberty ID-WSF Data Services Template." Liberty Alliance Project, Version: 2.1, Jul. 2006.
Cahill, C. et al. (Ed.). "Liberty ID-WSF Discovery Service Specification." Liberty Alliance Project, Version: 2.0—errata-v1.0, Jul. 2007.

(Continued)

*Primary Examiner* — Dhairya A Patel
(74) *Attorney, Agent, or Firm* — Coats & Bennett, P.L.L.C.

(57) ABSTRACT

A controller (12) is used for privacy management in an identity network (10) for a principal (20). An identity network (10) is a computer network including at least an identity provider (14), a discovery service provider (16), and a service provider (18) with which the principal (20) can make transactions. A principal (20) is a system entity whose identity can be authenticated. An identity resource (14) is either data related to an identity or group of identities, or a service associated with an identity or group of identities. The controller (12) queries a discovery service provider to obtain information regarding available identity resources (14), it receives back addressing information for addressing attributes of the identity resources (14), and it then interacts, based on the addressing information, with a service provider (18) to create, read, modify or delete a privacy attribute governing the use of an identity resource (14).

14 Claims, 8 Drawing Sheets

(56) References Cited

U.S. PATENT DOCUMENTS

| | | | |
|---|---|---|---|
| 2006/0053490 A1* | 3/2006 | Herz et al. | 726/23 |
| 2007/0143427 A1* | 6/2007 | Tischer | 709/206 |
| 2008/0256605 A1* | 10/2008 | Malinen | 726/4 |
| 2010/0063867 A1* | 3/2010 | Proctor et al. | 705/10 |
| 2010/0146130 A1* | 6/2010 | Montemurro et al. | 709/228 |
| 2011/0179181 A1* | 7/2011 | Elz | 709/227 |

OTHER PUBLICATIONS

Author Unknown. "An Overview of the Id Governance Framework." Liberty Alliance Project, Version: 1.0, Jul. 2007.

Landau, S. (Ed.). "Liberty ID-WSF Security and Privacy Overview." Liberty Alliance Project, Version: 1.0, Copyright 2003.

Yee, G. O. M. "A Privacy Controller Approach for Privacy Protection in Web Services." Proceedings of the 2007 ACM Workshop on Secure Web Services, Fairfax, VA, USA, Nov. 2, 2007.

* cited by examiner

METHOD FOR PRIVACY MANAGEMENT IN AN IDENTITY NETWORK, PHYSICAL ENTITIES AND COMPUTER PROGRAM THEREFOR

TECHNICAL FIELD

The present invention relates to privacy management in an identity network. In particular, the invention relates to methods for carrying out privacy management in an identity network, to physical entities configured therefor, and to computer programs comprising instructions configured, when executed on a computer, to cause the computer to carry out the above-mentioned method. The invention may notably be used for managing the identity, and properties associated therewith, of users or systems using services offered in a computer network.

BACKGROUND

In telecommunications and computer networks, an identity network includes a plurality of service providers and an identity provider, forming what is sometimes called a circle of trust. A principal, which is a more generic term for a user, is a system entity whose identity can be authenticated. A principal may for instance be an individual user, a group of individuals, an organisational entity such as a corporation, or a network component. The identity provider is a system entity configured to manage the identity information on behalf of the principals. The identity provider can provide assertions of principal authentication to the service providers. Thus, when a principal wishes for instance to access the services offered by a service provider, the service provider can refer to the identity provider of the identity network for authentication of the principal prior to enabling the service offered by the service provider to be used by said principal.

For instance, the Liberty Alliance (http://www.projectliberty.org/ or Liberty Alliance Project c/o IEEE-ISTD, Piscataway, N.J., United States) has released a set of specifications disclosing frameworks for providing services in telecommunications and computer networks based on identity management. One of these specifications is the Identity Federation Framework (ID-FF) which defines methods for single sign-on authentication for a principal across a plurality of service providers. In other words, such framework enables the access by users to services provided across a computer network, such as the Internet, by authenticating once before accessing the services provided on multiple web sites.

A further specification or framework released by the Liberty Alliance is the Liberty Identity Web-Services Framework specification set or ID-WSF for short. In addition to the single sign-on services of the ID-FF, the ID-WSF enables some service providers to store attributes of a principal, wherein the attributes relate to the identity of the principal, and further enables retrieving some of these attributes by other service providers, also called consumers or web-service consumers (WSC).

In an identity network complying with the ID-WSF specification, when a service provider has some information or resources associated with a principal, the information or resources can potentially be shared with other service providers, subject to the principal's consent. In this exemplary identity network implementation, a discovery service may be used by service providers to register the identity resources associated with a principal so that other service providers, or WSCs, can discover and use them.

In this context, a principal should be able to control which resource stored on or provided by a service provider and associated with the principal can or cannot be shared or used by other service providers. Such control task is generally referred to, from a principal's perspective, as privacy management. In other words, the privacy is the proper handling of principal's information, consistent with the preference of the principal. Service providers are responsible for meeting the principal's privacy settings and preferences.

It is desirable to provide methods, physical entities and computer programs to enable users, or principals, to conveniently manage their privacy settings within an identity network, with in mind the need to reduce the operational burden on the principals.

SUMMARY

To meet or to at least partially meet these objectives, controllers, methods and computer programs are defined in the independent claims. Advantageous embodiments are defined in the dependent claims.

In one embodiment, a controller is used for privacy management in an identity network for at least one principal. In this context, an identity network is a computer network including at least an identity provider, a discovery service provider, and a service provider with which the principal can make transactions. A principal is a system entity whose identity can be authenticated. An identity resource is either data related to an identity or group of identities, or a service associated with an identity or group of identities. The controller is configured for querying a discovery service provider of the identity network to obtain information regarding the identity resources available in the identity network and associated with the principal's identity. The controller is further configured for receiving, from the discovery service provider, information, here referred to as addressing information, usable for addressing attributes of the identity resources available in the identity network and associated with the principal's identity. Yet further, the controller is configured for interacting, based on the addressing information, with a service provider to create, read, modify or delete an attribute governing the use of an identity resource available in the identity network and associated with the principal's identity. The attribute is here referred to as privacy attribute.

In this context, the controller may be a server computer or may be hosted on a server computer. An identity provider is a role assigned to a system entity within the identity network. The identity provider stores and manages identity information on behalf of principals and provides assertions to authenticate principals when requested to do so by other providers, such as service providers. A system entity is an element of a computer system or network system, which can be active in the sense that computer-implemented processes (such as the processes proper to a role) can be operated on the element. An identity, and more specifically a principal's identity, is one of the characteristics of the principal which identifies it or which is mapped in some way to the principal to identify it.

A discovery service provider is a role assigned to a system entity within an identity network. The discovery service provider has capabilities to identify, i.e. discover, services, or more generally identity resources, available on or from service providers in the identity network. A service may for instance be discoverable because it has been assigned a service type uniform resource identifier (URI). The discovery service provider is used to identify resources, including both services and data associated with the principal's identity.

A service provider is a role assigned to a system entity which typically involves providing services in relation to or for a principal. The provision of a service is a technical and economical activity which may for instance result in the ownership of physical goods through a sale, modification of the technical characteristics of a computer configuration, etc. The service may be a web service.

To authenticate is the process of confirming the asserted identity of a system entity, such as a principal, with a specified, or understood, level of confidence. An attribute governing the use of an identity resource is an attribute specifying the permission(s) associated with the identity resource, i.e. the privilege(s) granted to system entities with respect to operations that may be performed on, or in relation to, the identity resource.

The controller provides a point of control to centrally manage the privacy settings associated with the identity resources available in the identity network and associated with a principal. Therefore, users, or more general principals, wanting to know which information is stored on which system entity of the identity network need not go through every single system entity or service provider within the identity network. Instead, a view of their identity resources can be obtained, i.e. retrieved or read, and controlled thanks to the controller. Namely, the controller is configured to query a discovery service provider of the identity network to collect addressing information usable for addressing the identity resources associated with the principals. Thereafter, interactions can take place, based on the addressing information, i.e. using the addressing information, in order to manage the privacy attributes or settings of the identity resources associated with the principal within the identity network.

The following may assist in fully understanding the problems addressed and solved by the invention. Based, for instance, on the Liberty Identity Governance Framework (IGF) (see Liberty Alliance Project, *An Overview of the Id Governance Framework*, Version 1.0, 2007, available from http://www.projectliberty.org, under the Filename: overview-id-governance-framework-v1.0.pdf), a solution to manage privacy policies in relation to identity resources associated with a principal could be to provide a custodian of certain attributes in order to offer a web portal allowing users of the attributes to establish some privacy preferences and thus allowing the development of the privacy policies. However, this would require the users to visit each of the service providers to enter their privacy preferences associated with the identity resources hosted on the service providers. This would also require the user to adapt to each of these distinct web portals to manage the attributes scattered within the network. Moreover, no guarantee could be offered that some attributes that are associated with some identity resources and that a user is not aware of could be successfully identified and controlled.

In the invention, the controller provides a centralized point of control to obtain a consistent view of the identity resources available in an identity network and associated with a principal. A control point for distributed privacy management in an identity network is thus provided to the users or, more generally, principals.

The invention is not limited to its application to a Liberty Alliance framework. It may be used and applied in other identity networks such as computer-implemented social networks, or identity networks based on other identity frameworks such as, but not limited to, the so-called OpenID or OpenSocial frameworks. OpenID is a framework for user-centric identity on the Internet and is maintained by the OpenId Foundation, based in San Ramon, United States (see also http://openid.net/). OpenSocial provides a set of application programming interfaces (API) to help web-based social networking applications to share their social data and is maintained by the OpenSocial Foundation based in San Francisco, U.S. (see also http://www.opensocial.org/).

In one embodiment, the controller is configured to query the discovery service provider, to receive the addressing information and to interact with the service provider to manage the privacy attributes associated with a principal, without receiving a specific request from the principal instructing it to do so. The rules for privacy management are in this embodiment stored on the controller either as a result of a previous communication with the principal for defining these criteria based on its preferences, or as a result of a default configuration in the controller. This enables privacy management to be carried out without intervention or with less intervention of the principal.

In one embodiment, the controller is further configured for, before querying, receiving, from the principal, a request to retrieve information regarding the identity resources available in the identity network and associated with the principal's identity. This enables the controller, in response to an express request of the principal, to collect the addressing information and manage the privacy attributes at the request of and on behalf of the principal.

In one embodiment, the controller is further configured for obtaining, from at least one service provider of the identity network, information, here referred to as usage information, regarding the usage of the identity resources associated with the principal's identity in at least one service provider.

This embodiment enables principals to obtain a dynamic view of the identity resources associated with their identity. The obtainable view is dynamic in the sense that the principals can obtain information on how and when, that is when during at least a period of time, the identity resources have been used by which service providers. The principals can thus collect information about the usage of the identity resources as far as the usage concerns them. The principals may then decide whether to take action to modify their privacy settings as a result of and/or based on this knowledge. The usage history retrieval may be performed upon receiving by the controller an express request from a principal. Alternatively, the controller may be configured in advance, either based on an initial interaction with a principal or based on default settings, to retrieve the usage history of the identity resources that are within the identity network and that are associated with the principal.

The usage information may notably include information about one or more of the type of an identity resource, the attribute values of an identity resource, timestamps of access to the identity resources, and identifiers of service providers which access, have accessed, use, or have used the identity resource, or subscribe or have subscribed to the identity resource.

The invention also relates to a method carried out by a controller for privacy management in an identity network for at least one principal. The method includes the step of querying a discovery service provider of the identity network to obtain information regarding the identity resources available in the identity network and associated with the principal's identity. The method further includes the step of receiving, from the discovery service provider, information, here referred to as addressing information, usable for addressing attributes of the identity resources available in the identity network and associated with the principal's identity. The method further includes the step of interacting, based on the addressing information, with a service provider to create, read, modify or delete an attribute governing the use of an identity resource available in the identity network and associated with the principal's identity, the attribute being here referred to as privacy attribute.

The invention also relates to a computer program including instructions configured, when executed on a computer or the above-described controller, to cause the computer or the controller respectively to carry out the above-described method. The invention also relates to a computer program product or computer-readable medium including such a computer program.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
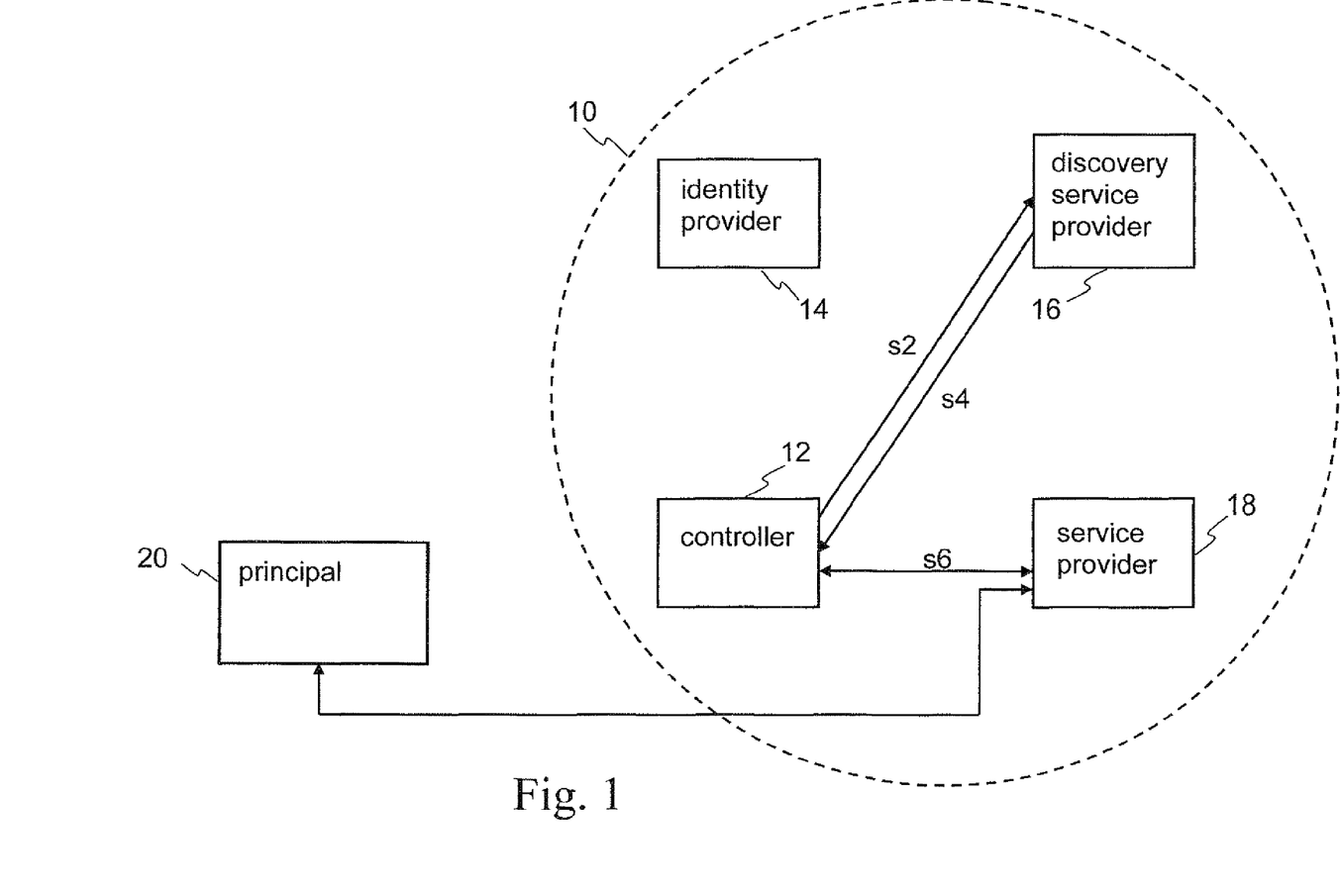
FIG. 1 schematically illustrates a network configuration involving a controller in one embodiment of the invention.

FIG. 1 schematically illustrates a network configuration involving a controller 12 according to an embodiment of the invention. The controller 12 can also be referred to as privacy controller 12.

An identity network 10, or circle of trust, includes a controller 12, an identity provider 14, a discovery service (DS) provider 16, and a service provider 18. Each element of the identity network 10 may form a network node in the form of a server computer. As mentioned above, the identity provider 14 is configured to store and manage identity information on behalf of principals 20 and provides assertions to authenticate principals 20 when requested to do so by other providers, such as service providers 18. The DS provider 16 is capable of identifying, i.e. discovering, the identity resources available on or from service providers 18 in the identity network 10. The service provider 18 is in charge of providing services in relation to or for a principal 20. The double-headed arrow between the principal 20 and the service provider 18 illustrates that transactions can be made between the principal 20 and the service provider 18.

Although only one service provider 18 is shown in FIG. 1, more than one service provider 18 may be provided in the identity network 10. The service providers 18 may for instance be web service providers. Likewise, although only one principal 20 is illustrated as interacting with a service provider 18 of the identity network 10, more than one principal 20 may interact with the service provider 18 of the identity network 10.

The DS provider 16 may for instance be hosted in a network node managed by a telecom operator. In one embodiment, the DS provider 16 is collocated with the identity provider 14.

The controller 12 is configured for querying s2 the DS provider 16 to obtain information on the identity resources available in the identity network 10 and associated with the principal's identity. In response, the DS provider 16 sends s4, to the controller 12, addressing information usable for addressing attributes of the identity resources available in the identity network 10 and associated with the principal's identity. Then, the controller 12 can interact s6, using the addressing information, with a service provider 18 to create, read, modify or delete a privacy attribute governing the use of an identity resource available in the identity network 10 and associated with the principal's identity.

Although not shown in FIG. 1, the following exchanges or interactions (i) to (iv) may also take place in the identity network 10:

(i) The principal 20 and the controller 12 may communicate in that the controller 12 may make information available to the principal 20. In response, the principal 20 may instruct the controller 12 to take further actions such as querying the DS provider 16 or interacting with a service provider 18. This may take the form of a graphical user interface generated on a computer display, if the principal is or is associated with a user interacting with a computer.

(ii) A service provider 18, such as a web service provider (WSP), may inform the DS provider 16 that it stores an identity attribute regarding a principal 20. This is a registering operation. That is, a service provider 18 of the identity network 10 may register, or in one embodiment must register, its identity resource with the DS provider 16.

(iii) A service provider 18, such as a web service consumer (WSC), may query the DS provider 16 to discover the service providers 18 that store some identity resources regarding a principal's identity. The WSC may also ask the DS provider 16 for credentials to access the identity resources. This is a discovering operation.

(iv) A service provider 18, such as a web service consumer (WSC), may use retrieved credentials to try to access an identity resources (or attributes thereof) stored in, or provided by, a service provider 18. This is a querying operation.

In one embodiment, the controller 12 acts as a Liberty-compliant service provider 18, such as a web service provider (WSP) within the identity network 10, or circle of trust (CoT) 10. Thus, the controller 12 needs to be authenticated, on behalf of the principal 20, against the CoT 10 in order to gain access to the CoT entities. The authentication may be carried out for instance following any one of the methods described in Liberty ID-FF (Web redirection, SOAP profile, etc) or Liberty ID-WSF (Authentication Service or Single Sign On service). Other authentication methods may also be used. As a result, the controller 12 obtains an endpoint reference (EPR) to the DS provider 16 and credentials to access it. This process is sometimes referred to as DS bootstrap.

Figure 2:
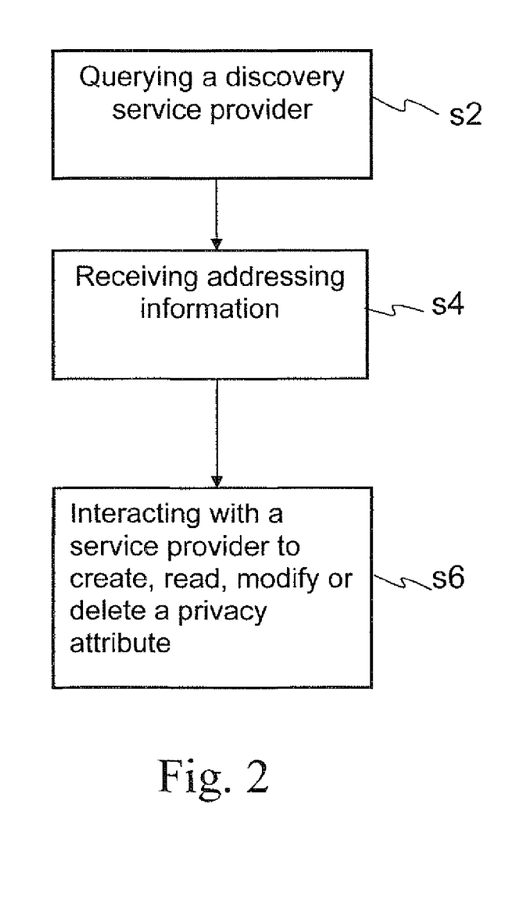
FIG. 2 is a flowchart illustrating the steps performed by a controller 12 in a method according to one embodiment of the invention.

FIG. 2 is a flowchart illustrating the steps performed by a controller 12 in one embodiment of the method of the invention. The controller 12 queries s2 a DS provider 16 of the identity network 10 to obtain information regarding the identity resources available in the identity network 10 and associated with the principal's identity. It then receives s4 from the DS provider 16 addressing information usable for addressing attributes of the identity resources available in the identity network 10 and associated with the principal's identity. Then, it may interact s6 with a service provider 18 to create read, modify or delete a privacy attribute.

Figure 3:
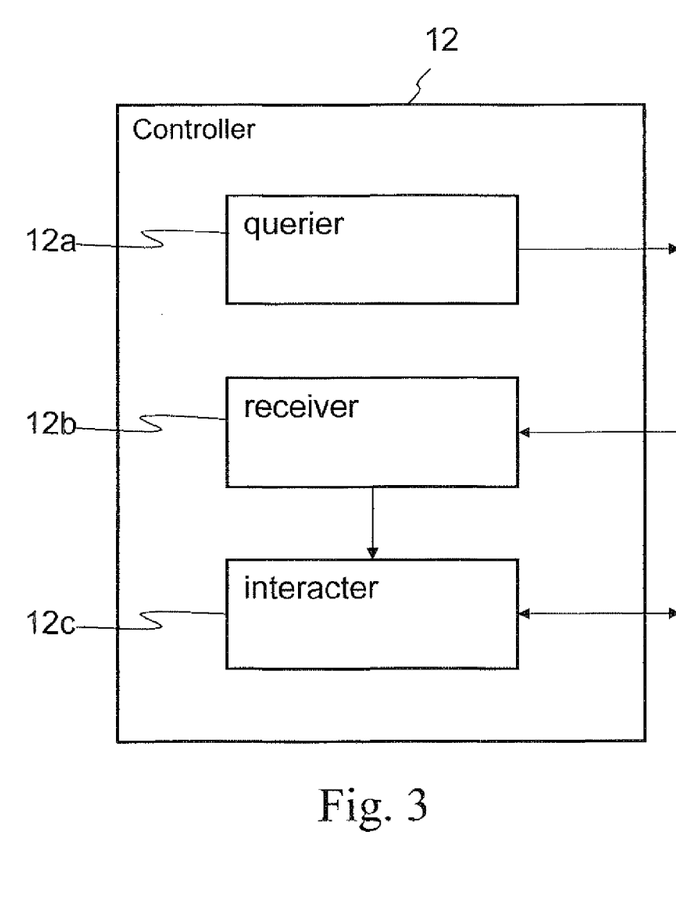
FIG. 3 schematically illustrates a controller in one embodiment of the invention, notably configured for performing the method illustrated in FIG. 2.

FIG. 3 schematically illustrates a controller 12 in one embodiment of the invention. The controller 12 comprising a querier 12*a*, a receiver 12*b* and an interacter 12*c* respectively configured to perform the steps s2, s4 and s6 illustrated in FIG. 2. The arrow originating from the querier 12*a* illustrates that the querier 12*a* is configured to send s2 a query to the DS provider 16. Likewise, the arrow arriving at the receiver 12*b* illustrates that the receiver 12*b* is configured to receive s4 the addressing information from the DS provider 16, in response to the query. The arrow from the receiver 12*b* to the interacter 12*c* illustrates that the interacter 12*c* is configured to use the addressing information to interact s6 with a service provider 18, as illustrated by the double-headed arrow on the right-hand side of the interacter 12*c*.

In one embodiment of steps s2 and s4, the controller 12 queries s2, or is configured to query s2, the DS provider 16 using an empty query for a principal 20, which results in a reply from the DS provider 16 comprising information usable for addressing the available attributes of identity resources associated with the principal 20 in the service providers 18. The information may then be made available, presented or sent by the controller 12 for use by the principal 20.

This provides the end users with a user-friendly solution for managing privacy aspects of their identity-related information scattered along a plurality of network entities, and, at the same time, it minimizes implementation impacts. Users need not go through every single service provider 18 that stores information about them in order to know what information is stored.

In one embodiment, the controller 12 needs to be authenticated within the circle of trust 10 before being able to carry out step s2. This applies mutatis mutandis to the other embodiments of the invention.

Figure 4:
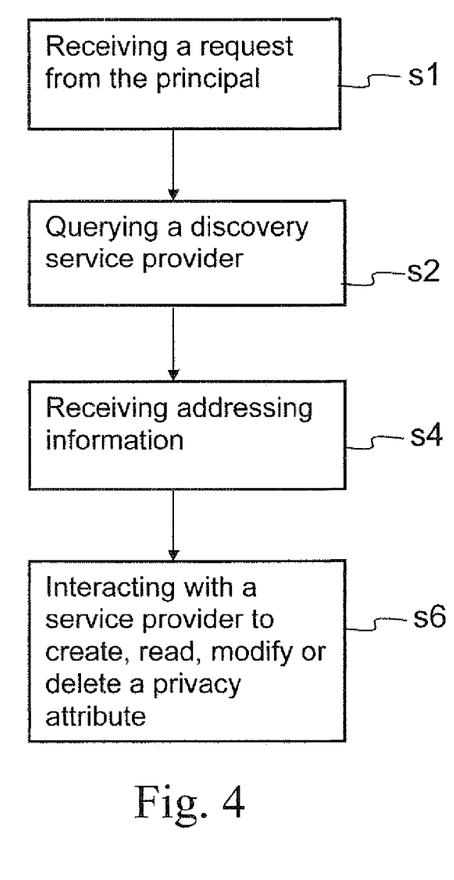
FIG. 4 is a flowchart of one embodiment of the method of the invention.

FIG. 4 is a flowchart of one embodiment of the method according to the invention, which differs from the one illustrated in FIG. 2 in that, before the step of querying s2 a DS provider 16, the controller 12 receives s1 a request from the principal 20. It is a request to retrieve information regarding the identity resources available in the identity network 10 and associated with the principal's identity.

Figure 5:
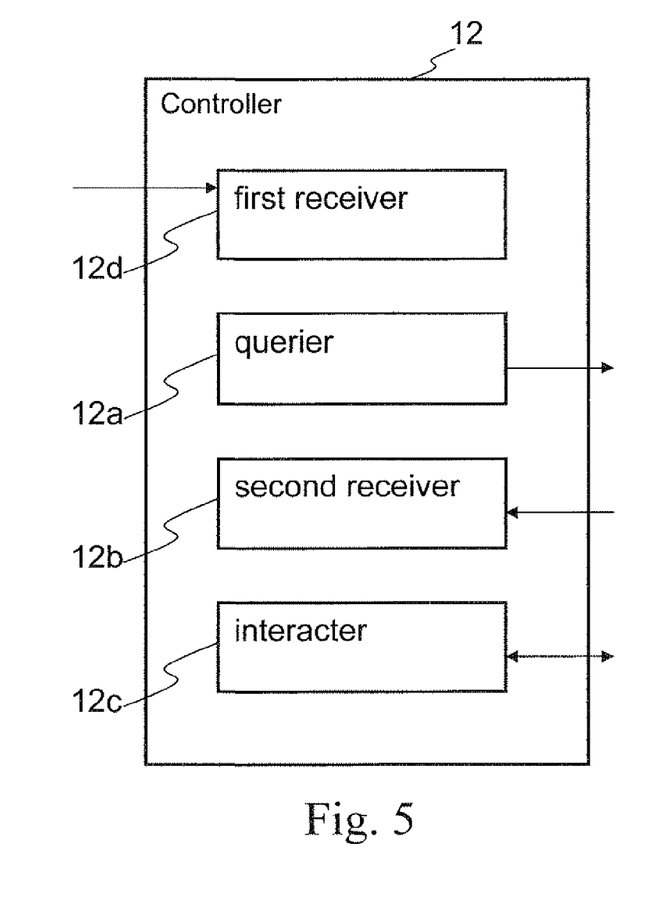
FIG. 5 schematically illustrates a controller in one embodiment of the invention, notably configured for performing the method illustrated in FIG. 4.

FIG. 5 schematically illustrates a controller 12 in one embodiment of the invention, which differs from the controller 12 illustrated in FIG. 3 in that a first receiver 12*d* is further provided to carry out the receiving step s1 illustrated in FIG. 4. The receiver 12*b* of FIG. 3 is referred to as second receiver 12*b* in FIG. 5.

The embodiments illustrated in FIGS. 4 and 5 enable principals 20 to know where their identity resources are stored within an identity network 10, i.e. where the principals can obtain a snapshot of their identity resources (i.e. the identity resources associated with their identity).

Figure 6:
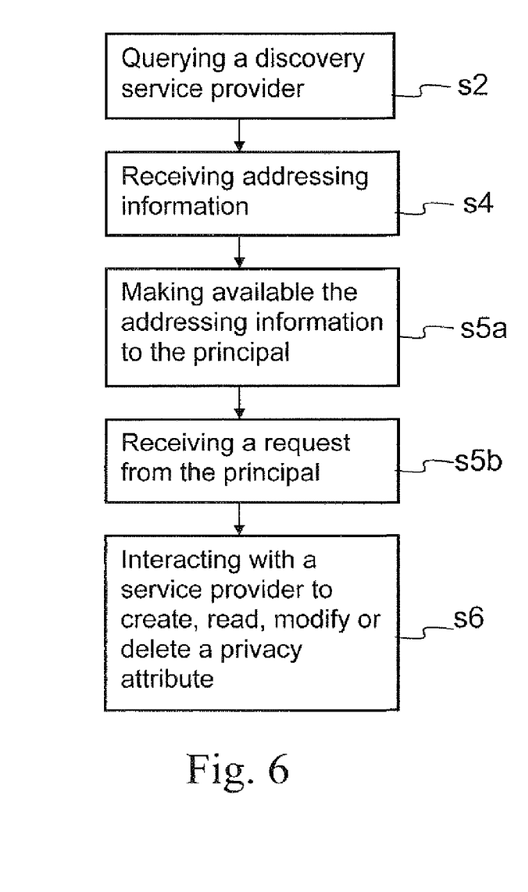
FIG. 6 is a flowchart of one embodiment of the method of the invention.

FIG. 6 is a flowchart of one embodiment of the method of the invention, which differs from the embodiment illustrated in FIG. 2 in that, between the steps of receiving s4 and interacting s6, at least two further steps are provided. Namely, a step s5*a* of making the addressing information available to the principal 20 and a step s5*b* of receiving a request from the principal 20 to create, read, modify or delete a privacy attribute are carried out. The step s6 of interacting with the service provider is then performed by the controller 12 based on the request received in step s5*b* from the principal 20.

Figure 7:
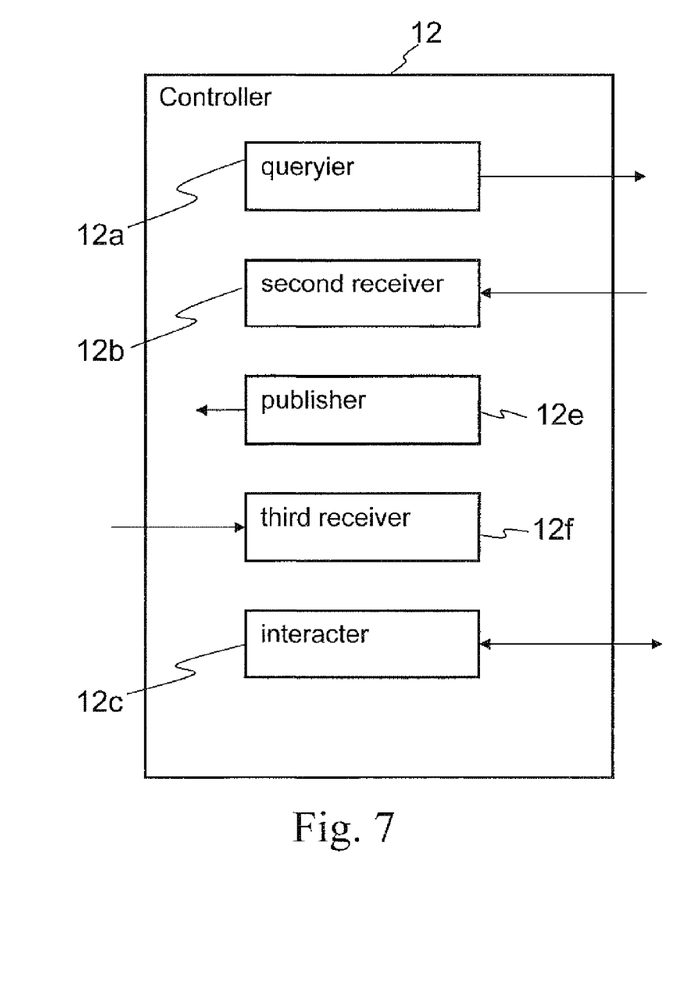
FIG. 7 schematically illustrates a controller in one embodiment of the invention, notably configured for performing the method illustrated in FIG. 6.

FIG. 7 schematically illustrates one embodiment of the controller 12 of the invention, configured for performing the method illustrated in FIG. 6. Namely, a publisher 12*e* and a third receiver 12*f* are provided to perform steps s5*a* and s5*b* as described with reference to FIG. 6.

Figure 10A:
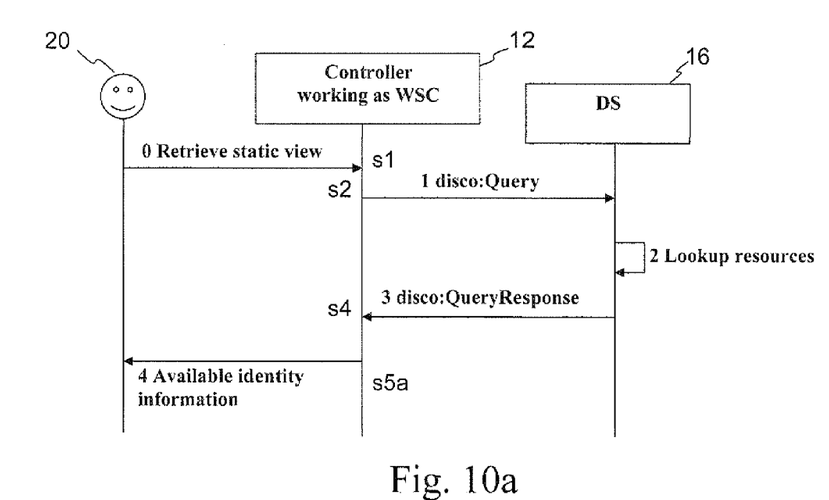
FIGS. 10a and 10b are sequence diagrams of one embodiment of the invention, which may result from the combination of the embodiments described with reference to FIGS. 4 and 6 and with reference to FIGS. 5 and 7 respectively.
Figure 10B:
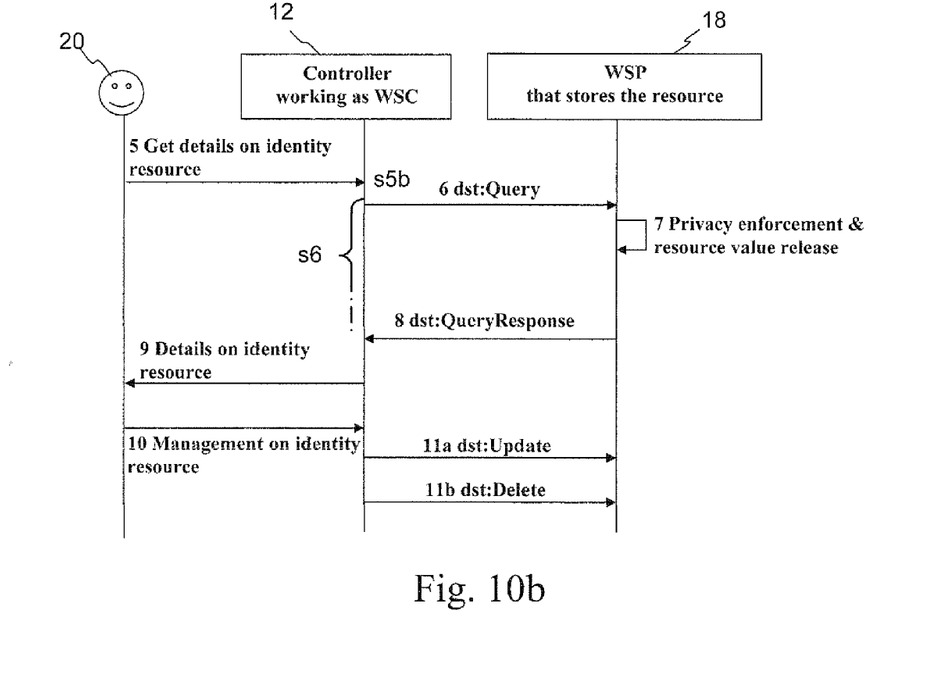

The embodiments described with reference to FIGS. 4 and 6 and with reference to FIGS. 5 and 7 respectively may be combined. That is, an embodiment including the steps s1, s2, s4, s5*a*, s5*b* and s6, and an embodiment of a controller 12 including a first receiver 12*d*, a querier 12*a*, a second receiver 12*b*, a publisher 12*e*, a third receiver 12*f* and an interacter 12*c* are within the scope of the invention. FIGS. 10*a* and 10*b* illustrate a sequence diagram relating to such an embodiment.

The principal 20 sends s1 a request to the controller 12 to retrieve a view of the set of identity resources that are associated with said principal 20 and that are stored within the identity network 10, or circle of trust (CoT) 10 (FIG. 10, "0 Retrieve static view"). Then, the controller 12 queries s2 the DS provider 16 for all the identity resources associated with the principal 20 in the CoT 10 (FIG. 10*a*, "1 disco:Query"). This may notably be achieved using an empty query request message. As stated in Hodges, J. and Cahill, C. (Eds.), *Liberty ID-WSF Discovery Service Specification*, Version 2.0, Liberty Alliance Project, July 2006, filename: liberty-idwsf-disco-svc-v2.0.pdf, available through the URL http://www.projectliberty.org/, here referred to as [LibertyDisco], "*A <Query> request message is empty in the minimal case. Such a request indicates the requester is requesting all available ID-WSF EPRs, regardless of security mechanisms or service types.*" (page 32, section "3.3.2. <Query> Message").

After receiving the request, the DS provider 16 looks up internally for the location of identity resources associated with the principal's identity (FIG. 10*a*, "2 Lookup resources"). As a result, the DS provider 16 sends back s4 to the controller 12 working as WSP a response that includes the location (this is a specific embodiment of the addressing information) of the attributes of the identity resource available (EPR) and the credentials to access it (FIG. 10*a*, "3 disco:QueryResponse"). The controller 12 makes this information available s5a (or presents the information, or in one embodiment sends the information) to the principal (FIG. 10a, "4 Available identity information"). Steps "1 disco: Query", "2 Lookup resources" and "3 disco:QueryResponse" may therefore be built upon the mechanisms described in [LibertyDisco].

Then, the principal 20 may request further information, such as the current value of a specific attribute of an identity resource. Therefore, the principal 20 specifies that identity resource and instructs s5b the controller 12 to retrieve the value associated with this identity resource (FIG. 10b, "5 Get details on identity resource"). The controller 12, working as a WSC, queries s6 the WSP that stores the selected identity resource using the EPR and the credentials retrieved in the previous step (FIG. 10b, "6 dst:Query"). To do so, the Query operation of the Liberty Data Service Template (DST) protocol described in Kellomäki, S. and Kainulainen, J, (Eds.), Liberty ID-WSF Data Services Template, Version 2.1, Liberty Alliance Project, July 2006, filename: liberty-idwsf-dst-v2.1.pdf, available through the URL http://www.projectliberty.org/, here referred to as [LibertyDST], may be used. [LibertyDST] is the Liberty protocol that allows WSCs to access WSPs in order to query, update or cancel principal's data on behalf of a principal 20.

The WSP enforces privacy policies when the request arrives and, if permitted by the policies, releases the requested information. In other words, the WSP enforces privacy policies before they release any identity resource (FIG. 10b, "7 Privacy enforcement & resource value release"). The response is sent back to the controller 12 following DST protocols ("8 dst:QueryResponse"). Finally, the controller 12 makes the information available (or presents the information, or in one embodiment sends the information) to the principal 20 ("9 Details on identity resource").

The principal 20 may then carry out further management operations ("10 Management on identity resource") on the identity resource such as updating ("11a dst:Update") or cancelling ("11b dst:Delete") the information. These operations may therefore be built upon the mechanisms described in [LibertyDST].

Since the above operations may be based on the mechanisms described in [LibertyDisco] and [LibertyDST], some embodiments of the invention may be implemented based on existing protocols and are therefore simple to carry out.

Figure 8:
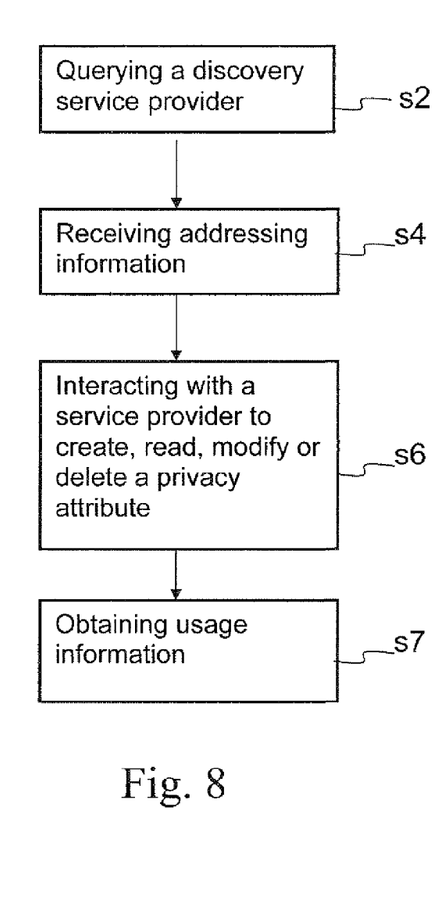
FIG. 8 is a flowchart of one embodiment of the method of the invention, with a step of obtaining usage information on the usage of identity resources associated with a principal's identity.

FIG. 8 is a flowchart of one embodiment of the method of the invention, which differs from the method illustrated in FIG. 2 in that a further step s7 of obtaining usage information is provided after the step of interacting s6. The step s7 consists in obtaining, from at least one service provider 18 of the identity network 10, usage information regarding the usage of the identity resources associated with the principal's identity in the at least one service provider 18. Obtaining such usage information, or consumption information, enables principals to know how the identity resources associated with the principals have been used by service providers 18. Which data has been exchanged between which service providers 18 can be obtained by the principal 20. Therefore, users need not go through every single service provider 18 that stores information about them in order to know what information is being stored and, furthermore, which entities have requested and retrieved the information.

Figure 9:
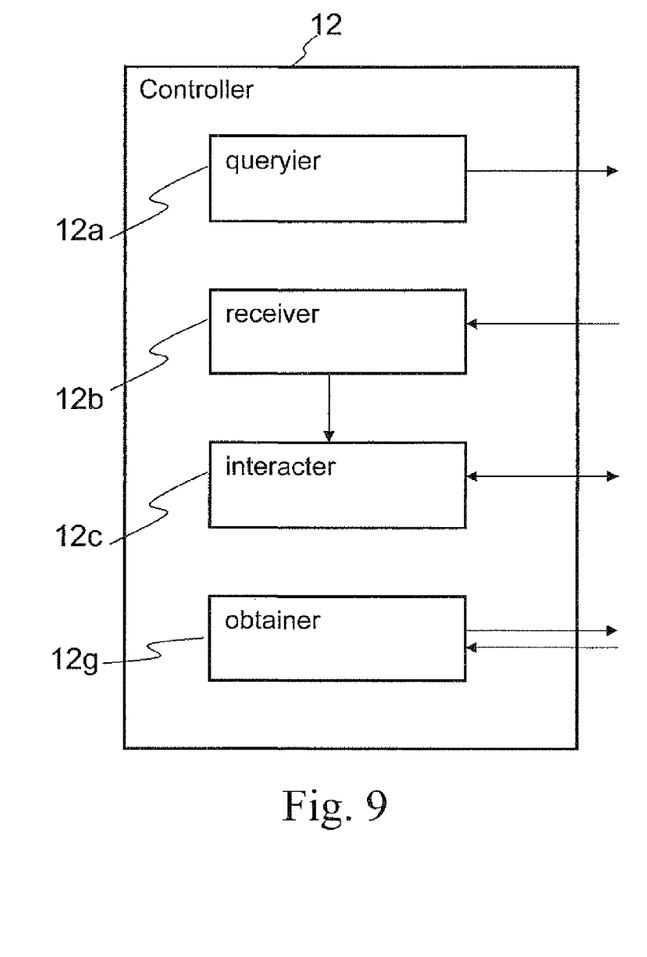
FIG. 9 schematically illustrates one embodiment of the controller 12 of the invention, notably configured for performing the method illustrated in FIG. 8.

FIG. 9 schematically illustrates one embodiment of the controller 12 of the invention, which differs from the controller 12 illustrated in FIG. 3 in that an obtainer 12g is provided to perform the step s7 described with reference to FIG. 8.

Figure 11:
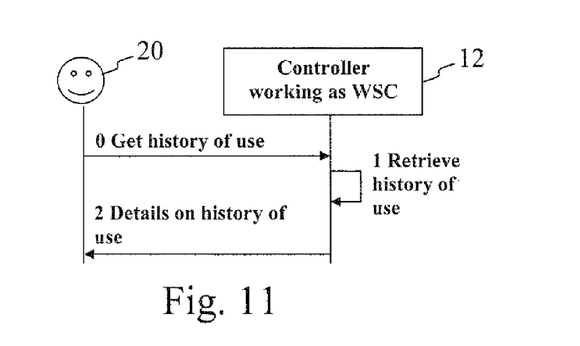
FIG. 11 is a sequence diagram of an embodiment of the invention, with identity resource usage retrieval.

FIG. 11 illustrates an example of implementation of the embodiments of the invention as described with reference to FIGS. 8 and 9, with identity resource usage/consumption retrieval, i.e. the dynamic view retrieval, wherein a principal 20 retrieves the usage history of one of its identity resources.

It is assumed here that the controller 12 has obtained addressing information usable for addressing attributes of the identity resources associated with a principal 20 in an identity network 10, or CoT 10. Now, the principal 20 wants to know the usage history of one of the identity resources associated with said principal 20 and, for that purpose, it specifies the identity resource and sends this information to the controller 12 (FIG. 11, "0 Get history of use"). The controller 12 then retrieves s7 the requested information ("1 Retrieve history of use"), which is then made available, or presented or in one embodiment sent, to the principal 20 ("2 Details on history of use"). The information made available, presented or sent, may include details about the identity resource type and value, timestamps of access and WSCs that have used the identity resource in the past. Further information may be presented if available such as the principal 20 on behalf of which the WSC 18 has used the identity resource (if any), the privacy promises made by the WSC 18 or conditions imposed by the WSP 18 when releasing said information.

The controller 12 may retrieve the usage history (FIG. 11, step 1) by different means (which will also be referred as approaches later on), for instance:

(A) Using the Liberty ID-WSF Accounting Service mechanisms, as defined in Le Van Gong, H. (Ed), *Liberty ID-WSF Accounting Service*, Version 1.0-03 Revision 5, Liberty Alliance Project, October 2007, http://www.projectliberty.orgh filename: draft-liberty-idwsf-acct-v1.0-03.pdf, here referred to as [LibertyAccount]. The WSP 18 that releases the information acts as an accounting client and the controller 12 acts as an accounting server. A new event type may be defined by extending the <event> complex type defined in [LibertyAccount]. This new event type includes the information related to the use of the identity resource. This solution may use mechanisms defined in the Liberty framework and thus no extension or adaption is needed.

(B) Using the Subscription/Notification mechanisms, as defined in Sampo Kellomäki, *Liberty ID-WSF Subscriptions and Notifications*, Version 1.0, Liberty Alliance Project, http://www.projectliberty.org/, filename: liberty-idwsf-subs-v1.0.pdf, here referred to as [LibertySubs]. These mechanisms enable WSCs 18 to subscribe to different events on WSPs 18. Usually these events are related to personal information updates, but other events are not precluded. Therefore, the controller 12 may subscribe to notifications in any WSPs 18 who custodies principal's identity resources. Thus, when a WSP 18 releases some of these resources, the WSP 18 sends a notification to the controller 12. This solution may also use mechanisms defined in the Liberty framework and thus no extension or adaption is needed.

(C) Extending the DST protocol mechanisms as described in [LibertyDST] (referred to above). It is here assumed that every WSP 18 accounts the release of identity resources as in the accounting service. However, the controller 12 should be able to request accounting information (pull mode). The accounting information may be considered as an extension of the information a Liberty profile contains: Logs add relevant data about the identity information consumption. Therefore, in this approach, the DST protocol is used to access the identity resources and, for that purpose, [LibertyDST] may be extended with a new operation:

trace. This operation allows a WSC 18 to request a WSP 18 to transmit usage information about some principal's identity resource.

The approaches (A), (B) and (C) may be further discussed as follows.

Approach (C) is advantageous in that it may be initiated by the controller 12 (pull mode). This means that the information is retrieved whenever the controller 12 wants to, and is limited to what the controller 12 asks for. Thus, no scalability or performance problems arise. However, this approach requires, when applied to the Liberty Alliance framework, adaption of said framework.

Approach (B) is advantageous in that, when applied to the Liberty Alliance framework, it does not require adaption of the framework, In other words, it is already Liberty compliant. Regarding scalability and performance, this approach needs one notification to be sent per identity resource and per principal 20 every time a WSP 18 is accessed.

Approach (A) has the same advantages as approach (B) regarding application to the Liberty Alliance framework and compliance therewith. In addition, it also improves performance, because it allows reducing the amount of messages generated by setting thresholds. For example, notifications may be sent in a per access rule i.e. WSP sends one single account with information about all the identity information accessed, thus reducing the amount of messages. On the controller side, no scalability or performance problems arise, since the controller 12 may just receive messages related to the principal 20 on the behalf of which it works.

From a functional point of view, approach (C) is advantageous over the other two approaches since approach (C) is capable of providing a pull mode. As described above, approach (C) needs however, when applied to the Liberty Alliance framework, adaptation, adaptation of said framework. Approach (C) is therefore here further described.

Approach (C) consists in using Liberty DST Extension, disclosed in [LibertyDST], to retrieve identity resources usage history, as explained above.

Figure 12:
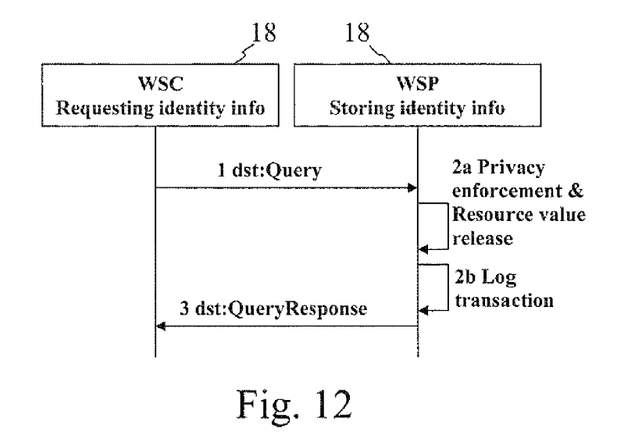
FIG. 12 is a sequence diagram illustrating a service provider acting as web service consumer (WSC) requesting to use an identity resource to a service provider acting as web service provider (WSP) in one embodiment of the invention.

It is here assumed that, whenever some attributes of an identity resource associated with a principal 20 is accessed by a WSC 18, the WSP 18 that stores, or provides access to, the identity resource logs the transaction. This log information may be used, for example, for future audits. FIG. 12 illustrates a WSC 18 requesting to use an identity resource to a WSP 18. The log operation (FIG. 12, "2b Log transaction") is also illustrated. During the log operation or log transaction, the WSP 18 logs the transaction, including which information regarding the identity resource has been released, to which principal 20 this information relates, which is the requested party (both the WSC 18 and the principal 20 on behalf of which the WSC 18 is working), and any other relevant information for future audit.

The information to be logged may notably include:
(i) a UserID, in order to know to which principal 20 the information which is used relates. This is the identifier or alias of the principal 20 in the WSP 18.
(ii) an Information_type, in order to know which identity information has been accessed, i.e. which attributes of the identity resource has been used.
(iii) a WSC, in order to know which WSC has requested the information.
(iv) other information, such as, for example, the time of access. Other pieces of information that may be useful to log include the intended use of the information retrieved, whether the WSC 18 intends to share the information with third parties, and the promises that the WSC 18 makes about the future use of the requested information. In addition, the WSP 18 may also log the principal 20 on behalf of which (if any) the WSC 18 is requesting the identity information. This information is particularly relevant in the context of computer-implemented social network applications.

Figure 13:
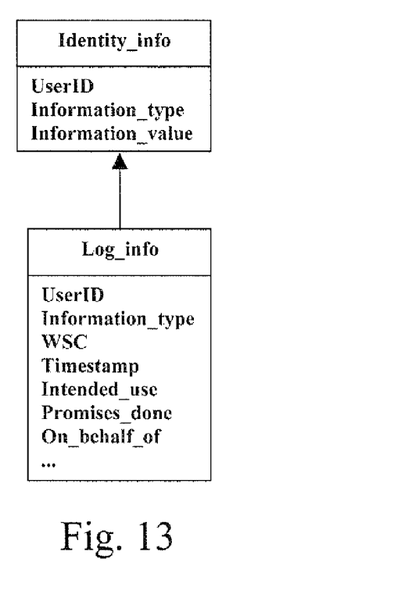
FIG. 13 is an example of structure of a log relating to the identity resource information accessed on a WSP.

FIG. 13 is an example of data structure of a log relating to the identity resource information which has been accessed on a WSP 18.

As illustrated in FIG. 13, the logged information is an extension of the information that a Liberty profile contains, which logs add relevant information about the information consumption. Therefore, the same mechanism may be used to access both of them, namely the mechanism described in [LibertyDST]. This mechanism allows for creating, querying, modifying and deleting principals' identity information from a WSP 18. [LibertyDST] may be extended with a new operation: trace. This operation allows a WSC 18 (the controller 12 working as a WSC in our case) to retrieve usage information about some principal's identity resources, as will be explained with reference to FIG. 14.

Figure 14:
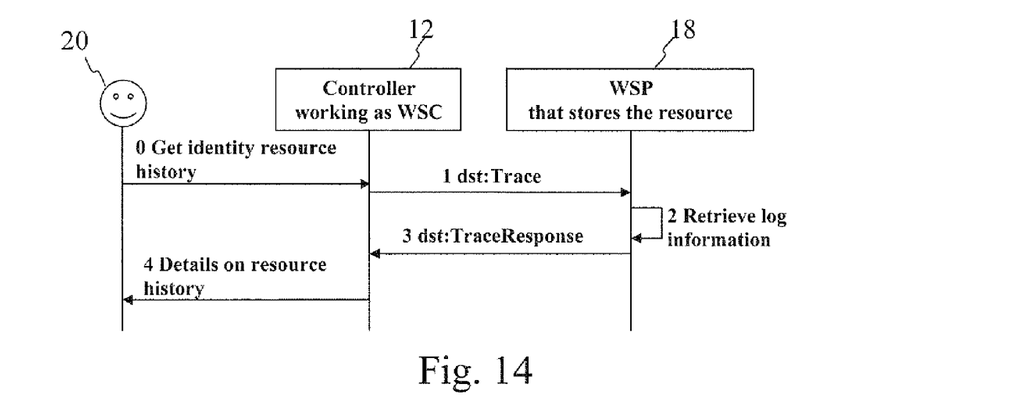
FIG. 14 is a sequence diagram showing, in one embodiment, the retrieval of the history of use of an identity resource, using the trace operation.

FIG. 14 illustrates a sequence diagram for the retrieval of the history of use of an identity resource, using the trace operation.

The impact on existing Liberty entities may be explained as follows. It depends on the selected approach:
Approach (B) may be built upon Liberty-compliant mechanisms and thus does not necessarily introduce any impact on the WSPs 18. The solution may be used and extended by defining new subscriptions regarding the privacy events.
Approach (A) is built upon a Liberty compliant mechanisms, and thus it does necessarily not introduce any impact.
Approach (C) introduces several modifications to the Liberty entities and protocols:
A new trace operation is added. Thus, the [LibertyDST] is extended and the XMLSchema is modified accordingly.
WSPs logs transactions related to usage and release of identity information. This mechanism does not necessarily affect nor modify existing Liberty specifications.
WSPs and WSCs support the new trace operation. This implies extending the WSP/WSC implementation to understand and manage a new DST operation.
The DS 16 supports the new trace operation. This implies extending the DS implementation to understand and manage a new DST operation.

Further embodiments of the step of interacting s6, based on the addressing information, with a service provider 18 to create, read, modify or delete a privacy attribute will now be described in more details. This step s6 relates the management of the privacy settings.

Figure 15:
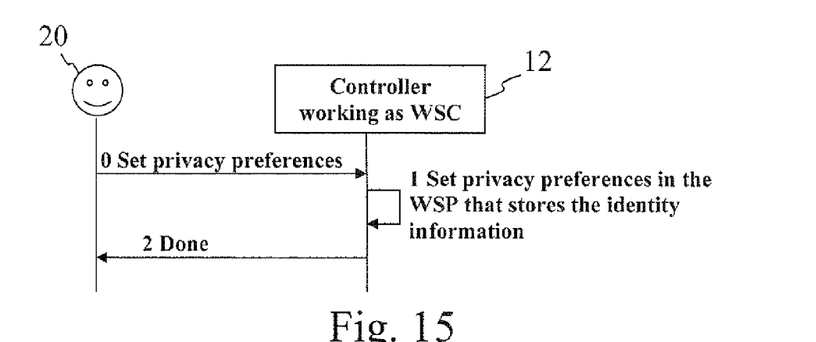
FIG. 15 is a sequence diagram showing, in one embodiment, the setting of privacy preferences.

It is assumed at this point that the controller 12 has retrieved addressing information for addressing attributes of the identity resources associated with a principal 20 in an identity network 10 or CoT 10. Now the principal 20 wants to set privacy preferences to govern the use and release of the identity resources associated with said principal 20 and stored in a WSP 18. The controller 12 shows different options to the principal 20 and allows the principal 20 to configure different parameters such as under which conditions the identity information can be released. When done, the controller 12 sets the resulting privacy policy in the appropriate WSP 18 that will enforce it. FIG. 15 illustrates an overview of the flows involved, in one embodiment. In other words, FIG. 15 illustrates how the principal 20 sets privacy preferences to govern the use and release of his identity information.

Principals 20 should be able to set their preferences regarding the use of the identity resources associated with them and distributed in a CoT 10.

The variables that participate in the privacy preference setting may include the requestor, the resource, the operation, the permission and the principal.

The principal 20 need not be explicitly stated since it is the user of the controller 12. The requestor may be any WSC 18 from the CoT 10. This information may be extended to the principal 20 on behalf of which the WSC 18 is requesting the identity information.

The resource is the identifier of the identity resource's attribute to be protected. The operation's values may be the ones that any WSC can request. For example, in the case of the Liberty Alliance framework, the operation's values may be the ones defined in DST protocol i.e. query, create, delete, modify and subscribe. If the approach to gather principals' identity information history based on extending the DST protocol with a trace operation (see above-discussed approach (C)) is used, the privacy policy may include the trace value for the operation variable. The solution may be extended to new operations as needed.

The permission may be set to grant, deny or askMe. The so-called askMe permission may be used when the user prefers to decide on a per invocation basis. This may be implemented by means of Liberty Interaction Service, described in Aarts, R. and Madsen, P. (Eds.), *Liberty ID-WSF Interaction Service Specification*, Version 2.0-04, Liberty Alliance Project, September 2005, (here referred to as [LibertyInteract]. In order to improve the usability of the solution, some options (wildcards) may be introduced: all possible values, none or a specific user-selected subset.

These values are set by the principal 20 and then sent back to the controller 12 (FIG. 15, step 0) and, as a result, a new privacy policy referring to a principal 20 and one of his identity resources is created in the controller 12. This basic privacy policy may be enhanced with the specification of further conditions upon which the information can be released.

The privacy policies and their association to identity resources in one embodiment are now described in more details.

Once the principal 20 has set the privacy preferences regarding an identity resource, the resulting privacy policy may be sent to the WSP 18 that stores that identity resource. To do so, the WSP 18 may declare in its interface that it manages information regarding privacy preferences and thus an extension to the target identity profile may be needed. This approach allows keeping together the identity resource and the policy that governs its use and release (sticky policies). Besides, it is built upon the existing feature in the Liberty specifications. The extension may be defined once and it may then be added to any identity profile. This extension introduces a modification on the standard LAP ID-SIS identity services. This extension is the same no matter the specific ID-SIS WSP.

Figure 16:
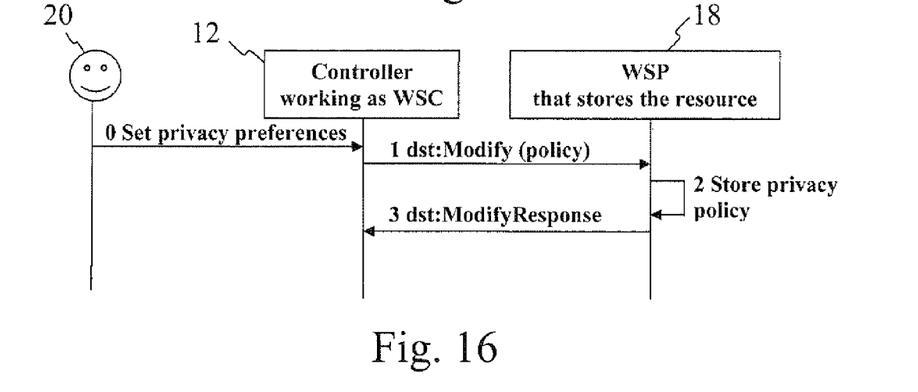
FIG. 16 is a sequence diagram showing, in one embodiment, the setting of privacy preferences by a controller in a WSP.

Once the WSP 18 allows operations on the privacy preferences, the controller 12 may take advantage of the mechanisms of the DST protocol to query, create, update or delete privacy policies in a WSP 18. Therefore, the controller 12 sends the principal-created privacy policy to the WSP 18 following the Liberty DST protocol (for a detailed description, see the description below with reference to FIGS. 16 and 17).

How principals 20 may express their privacy preferences will now be described in more details.

Principals 20 may express their privacy preferences using different means. First, they can choose one out of several pre-defined privacy policies and associate it to an identity resource. These pre-defined privacy policies may be described in natural language so that non-technically skilled users can understand them. This natural language description is mapped to a specific policy implementation described in a privacy policy expression language. These policies are hierarchical so that it is easier for users to compare among them and choose the one that better suits their needs. The approach benefits from its simplicity and usability because users do not have to deal with the policy details.

Principals 20 may also be allowed to define each detail of the privacy policy. This approach provides great flexibility in the description of preferences and may be offered as an advanced option.

How the controller 12 sets privacy preferences in a WSP 18 in one embodiment will now be described in more details. This corresponds to step 1 in FIG. 16, i.e. how the controller 12 may associate and send a privacy policy to the WSP 18 that stores the identity resource it governs. The controller 12 receives the principal preferences and translates them into a suitable privacy policy. The new privacy policy is sent to the WSP that stores the resource by means of a DST Create/Modify message.

Privacy policies may be associated to identity resources using an extension of the Liberty identity profile. [LibertyDST] provides mechanisms to create or update identity resources stored in a WSP 18. Therefore, building upon the [LibertyDST] may be used to allow the controller 12 to set privacy policies associated to an identity resource.

To implement this mechanism, the controller 12 may play the role of a Liberty WSC 18 and may include the privacy policy as part of the Create or Modify element that is sent to the WSP 18 as part of [LibertyDST]. This mechanism is built upon the [LibertyDST], since the policy may be carried as any other information in the body part of the message. On arrival of the policy, i.e. upon reception of the Create/Modify message (modify message illustrated in FIG. 16, "1 dst:Modify"), the WSP 18 retrieves, i.e. extracts, the policy information and stores it.

Figure 17:
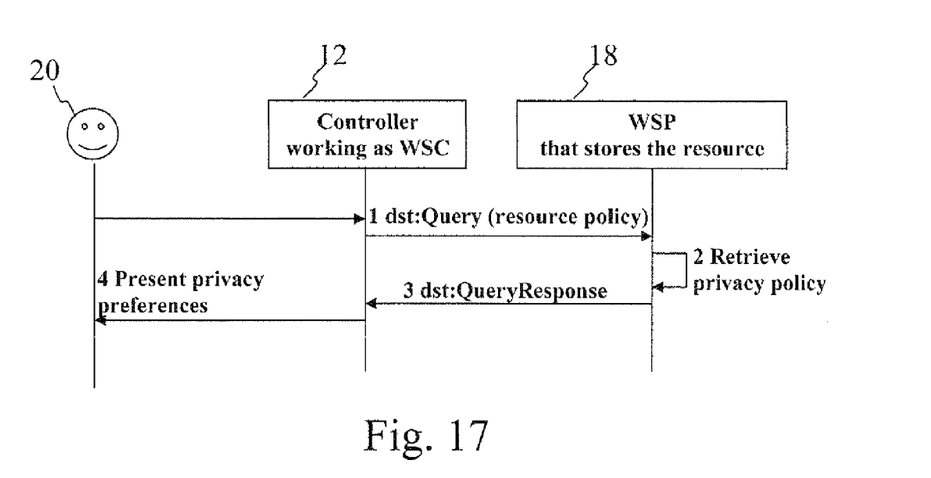
FIG. 17 is a sequence diagram showing, in one embodiment, a controller querying privacy policies associated to an identity resource.

How the controller 12 retrieves privacy preferences from a service provider 18 in one embodiment will now be described in more details, with reference to FIG. 17.

The controller 12 may retrieve privacy policies associated to an identity resource using the same mechanism as the one that was used to set them namely using DST protocol. In this case, however, the controller 12 may use the Query operation. Once the policy has been retrieved, the controller 12 translates it to privacy preferences so that the principal can understand it. FIG. 17 illustrates the controller 12 querying privacy policies associated to an identity resource. The controller 12 queries the privacy policies associated to a particular identity resource.

Eventually, regarding privacy policy enforcement, a WSC 18 requests an identity resource that is governed by a privacy policy set by the principal 20. The WSP 18 offering that identity resource enforces the policy thus deciding whether the identity resource may be released or not, and imposing certain conditions to the requester once the information is released. General guidelines on the steps to follow to enforce privacy policies may be found in Yavatkar, R. et al., *A framework for policy-based admission control*, IETF RFC 2753, January 2000. In other words, WSP looks up the privacy policy associated to the identity resource and sends it back, if it can be released.

In one embodiment, WSPs 18 stores and retrieves privacy policies. The means to carry out these operations are dependent on the WSP implementation. However, WSPs 18 may receive this information as a DST Create/Modify messages and they may release it as DST QueryResponse messages. Therefore, WSPs should be able to retrieve/include this information from/into DST messages.

In one embodiment, WSPs 18 implements a Policy Enforcement Point for privacy policy enforcement. This policy enforcement point intercepts requests to identity resources and decides on the appliance of privacy policies. The processing rules as defined in section 4.4.5 of [LibertyDST] may be followed in one embodiment.

In one embodiment, the controller 12 is able to use [LibertyDST] to Create/Modify/Query privacy policies in WSPs. Although the [LibertyDST] need not necessarily be modified, the controller 12 should be able to add privacy policies to a Create/Modify message and to retrieve privacy policies from a QueryResponse message.

In one embodiment, an extension to identity data services, as defined by Liberty ID-SIS specifications, is provided. This extension defines a container for privacy policies governing the use and release of the information contained within the profile. The extension is included in any data service supporting privacy policy management.

The physical entities according to the invention, including the controllers, identity providers, discovery service providers and service providers may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "querier", "receiver", "interacter", "first receiver", "second receiver", "publisher", "third receiver" and "obtainer" are used herewith, no restriction is made regarding how distributed these elements may be and regarding how gathered elements may be. That is, the constituent parts of these elements may be distributed in different software or hardware components or devices for bringing about the intended function. A plurality of distinct elements may also be gathered for providing the intended functionalities.

Any one of the above-referred elements of a controller may be implemented in hardware, software, field-programmable gate array (FPGA), application-specific integrated circuit (ASICs), firmware or the like.

In further embodiments of the invention, any one of the above-mentioned querier, receiver, interacter, first receiver, second receiver, publisher, third receiver and obtainer is replaced by querying means, receiving means, interacting means, first receiving means, second receiving means, publishing means, third receiving means and obtaining means respectively, or by querying unit, a receiving unit, an interacting unit, a first receiving unit, a second receiving unit, a publishing unit, a third receiving unit and obtaining unit respectively, for performing the functions of the querier, receiver, interacter, first receiver, second receiver, publisher, third receiver and obtainer.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A controller for privacy management in an identity network for at least one principal, wherein the identity network comprises a computer network including at least an identity provider, a discovery service provider, and a second service provider with which the principal can make transactions, and wherein a principal comprises a system entity whose identity can be authenticated, the controller comprising:
   a querying circuit configured to query the discovery service provider of the identity network to obtain identity resource information regarding identity resources available in the identity network and associated with the principal's identity, wherein an identity resource comprises data related to an identity or group of identities, or a service associated with an identity or group of identities;
   a first receiver configured to receive, from the discovery service provider, addressing information usable for addressing attributes of the identity resources available in the identity network and associated with the principal's identity; and
   an interacting circuit configured to interact, based on the received addressing information, with the second service provider to create, read, modify, or delete a privacy attribute governing the use of an identity resource available in the identity network and associated with the principal's identity;
   wherein the privacy attribute specifies permissions associated with the identity resource with respect to operations that may be performed by system entities on, or in relation to, the identity resource; and
   wherein the querying circuit, the first receiver, and the interacting circuit comprise separate circuits within the controller.

2. The controller of claim 1, further comprising a second receiver configured to receive, from the principal, a first request to retrieve the identity resource information regarding the identity resources available in the identity network and associated with the principal's identity.

3. The controller of claim 1, further comprising:
   a publishing circuit configured to make the addressing information available to the principal; and
   a third receiver configured to receive, from the principal, a second request to create, read, modify, or delete the privacy attribute; and
   wherein the interacting circuit interacts with the second service provider to create, read, modify, or delete the privacy attribute based on the second request received from the principal to create, read, modify, or delete the privacy attribute.

4. The controller according to claim 1, wherein the interacting circuit is configured to interact with the second service provider using a data services template protocol.

5. The controller according to claim 1, further comprising an obtaining circuit configured to obtain, from at least one service provider of the identity network, usage information regarding the usage of the identity resources associated to the principal's identity in the at least one service provider.

6. The controller according to claim 5, wherein the usage information includes information about at least one of the type of the identity resource, the attribute values of the identity resource, timestamps of access to the identity resources, and identifiers of the at least one service provider which access, have accessed, use, or have used the identity resource, or subscribe or have subscribed to the identity resource.

7. The controller according to claim 1, wherein the controller comprises a web service provider.

8. A method carried out by a controller for privacy management in an identity network for at least one principal, wherein the identity network comprises a computer network including at least an identity provider, a discovery service provider, and a second service provider with which the principal can make transactions, and wherein a principal comprises a system entity whose identity can be authenticated, the method comprising:
- querying the discovery service provider, using a querying circuit, of the identity network to obtain identity resource information regarding the identity resources available in the identity network and associated with the principal's identity, wherein an identity resource comprises data related to an identity or group of identities, or a service associated with an identity or group of identities;
- receiving, from the discovery service provider using a first receiver, addressing information usable for addressing attributes of the identity resources available in the identity network and associated with the principal's identity; and
- interacting, based on the received addressing information using an interacting circuit, with the second service provider to create, read, modify, or delete a privacy attribute governing the use of an identity resource available in the identity network and associated with the principal's identity;
- wherein the privacy attribute specifies permissions associated with the identity resource with respect to operations that may be performed by system entities on, or in relation to, the identity resource; and
- wherein the querying circuit, the first receiver, and the interacting circuit comprise separate circuits within the controller.

9. The method according to claim 8, further comprising, before querying, receiving, from the principal, a first request to retrieve the identity resource information regarding the identity resources available in the identity network and associated with the principal's identity.

10. The method according to claim 8, further comprising, after receiving and before interacting:
- making the addressing information available to the principal; and
- receiving, from the principal, a second request to create, read, modify, or delete the privacy attribute; and
- wherein interacting with the second service provider to create, read, modify, or delete the privacy attribute is based on the second request received from the principal to create, read, modify, or delete the privacy attribute.

11. The method according to claim 8, wherein interacting with the second service provider comprises interacting with the second service provider using a data services template protocol.

12. The method according to claim 8, further comprising obtaining, from at least one service provider of the identity network, usage information regarding the usage of the identity resources associated to the principal's identity in the at least one service provider.

13. The method according to claim 12, wherein the usage information includes information about at least one of the type of the identity resource, the attribute values of the identity resource, timestamps of access to the identity resources, and identifiers of the at least one service provider which access, have accessed, use, or have used the identity resource, or subscribe or have subscribed to the identity resource.

14. A computer program product stored in a non-transitory computer-readable medium for an identity network, said computer program product comprising instructions which, when executed on a computer in the identity network, causes the identity network to implement privacy management operations for at least one principal, wherein the identity network comprises a computer network including at least an identity provider, a discovery service provider, and a second service provider with which the principal can make transactions, and wherein a principal comprises a system entity whose identity can be authenticated, wherein the computer program product comprises instructions to:
- query the discovery service provider, using a querying circuit, of the identity network to obtain identity resource information regarding identity resources available in the identity network and associated with the principal's identity, wherein an identity resource comprises data related to an identity or group of identities, or a service associated with an identity or group of identities;
- receive, from the discovery service provider using a first receiver, addressing information usable for addressing attributes of the identity resources available in the identity network and associated with the principal's identity; and
- interact, based on the received addressing information using an interacting circuit, with the second service provider to create, read, modify, or delete a privacy attribute governing the use of an identity resource available in the identity network and associated with the principal's identity;
- wherein the privacy attribute specifies permissions associated with the identity resource with respect to operations that may be performed by system entities on, or in relation to, the identity resource; and
- wherein the querying circuit, the first receiver, and the interacting circuit comprise separate circuits within the controller.

* * * * *

UNITED STATES PATENT AND TRADEMARK OFFICE
CERTIFICATE OF CORRECTION

PATENT NO. : 8,805,985 B2
APPLICATION NO. : 13/263669
DATED : August 12, 2014
INVENTOR(S) : Monjas Llorente et al.

Page 1 of 1

It is certified that error appears in the above-identified patent and that said Letters Patent is hereby corrected as shown below:

In the Specification

In Column 1, Line 39, delete "IEEE-ISTD," and insert -- IEEE-ISTO, --, therefor.

In Column 3, Line 67, delete "OpenId" and insert -- OpenId --, therefor.

Signed and Sealed this
Twenty-fifth Day of August, 2015

Michelle K. Lee
*Director of the United States Patent and Trademark Office*